UNITED STATES PATENT OFFICE.

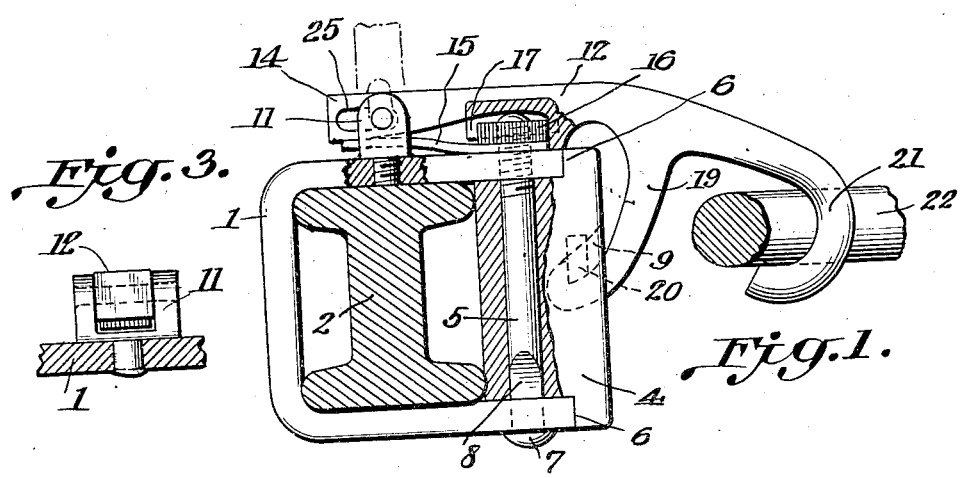
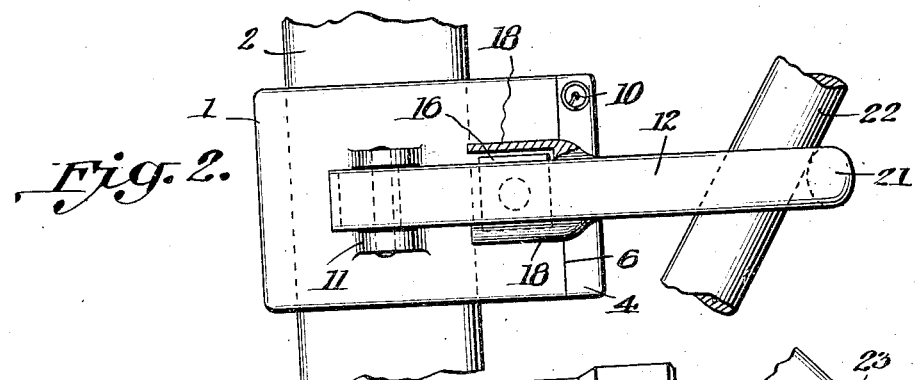
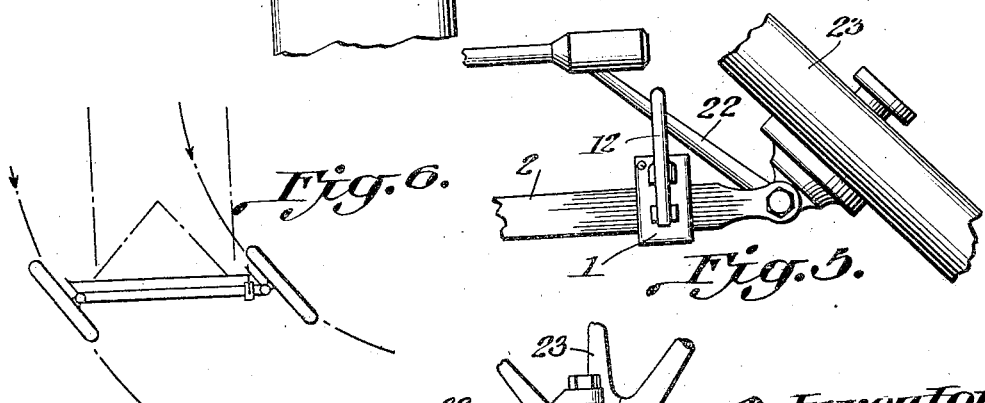
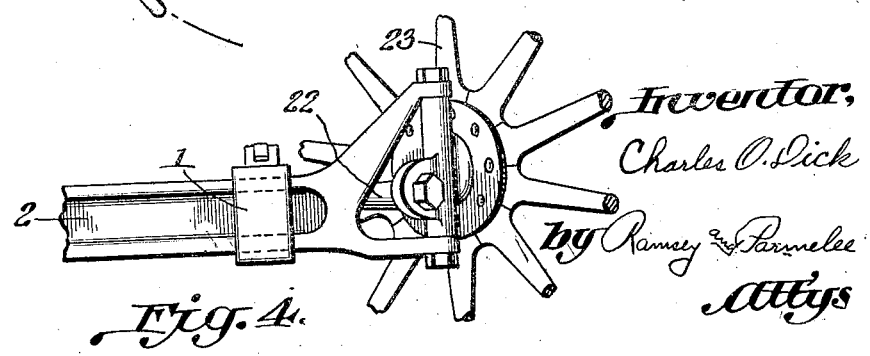

CHARLES OLIVER DICK, OF GLENWOOD, IOWA, ASSIGNOR OF ONE-HALF TO E. V. RHODES, OF GLENWOOD, IOWA.

AUTOMOBILE-LOCK.

1,218,932.  Specification of Letters Patent.  Patented Mar. 13, 1917.

Application filed November 1, 1916. Serial No. 129,032.

*To all whom it may concern:*

Be it known that I, CHARLES OLIVER DICK, a citizen of the United States, and a resident of the city of Glenwood, in the county of Mills, State of Iowa, have invented certain new and useful Improvements in Automobile-Locks, of which the following is a specification.

This invention relates broadly to locks and more particularly to automobile locks.

The principal object of this invention is to provide a lock for an automobile whereby the steering wheels are locked in position to cause the car to run in a circle.

Another principal object of this invention is to provide a lock which may be easily and permanently attached to an automobile and provided with a locking lever constructed to engage a part of the steering mechanism so that the car cannot be run in a straight line when the lock is applied.

A still further and more specific object in the present invention is to provide a lock for an automobile, comprising a member securable to front axle; the said member being provided with a locking lever adapted to be retained in inoperative position and constructed to be brought into operative position whereby the lever secures and retains the steering knuckle at an angle to cause the car to run in a circle.

Other and further objects of this invention will in part be obvious and will in part be pointed out hereinafter in the specification following by reference to the accompanying drawings, wherein like parts are indicated by like characters throughout the several figures thereof.

Figure 1 is an elevational view showing portions of the device in section. Fig. 2 is a plan view of the device illustrated in Fig. 1. Fig. 3 is a detail view or portion of the device. Fig. 4 is a detail view illustrating the relationship of the device to a steering knuckle of an automobile. Fig. 5 is a plan view of the parts illustrated in Fig. 4. Fig. 6 is a diagrammatic view illustrating the effect of the device upon the front wheels of an automobile when the device is locked.

Various types of automobile locks have been heretofore developed, particularly locks for the ignition, the gasolene line, and the operating levers. Locks for the steering mechanism have also been proposed. In substantially all of these devices the locks may be quickly rendered ineffective by the provision of detachable ignition systems or gasolene supply or by towing a car where the levers have been locked.

The device forming the present invention coöperates with a very rigid strong portion of the car and is effective to lock the parts so that a car cannot be towed nor can the locking mechanism be easily broken.

Referring now more particularly to the drawings, the invention comprises a U-shaped frame 1 adapted to be slipped over an automobile front axle 2 and to receive a lock carrying block 4 which is permanently secured within the frame 1 by means of a bolt 5. It will be noted that the lock carrying block 4 is recessed to provide shoulders as at 6 which abut with the ends of the U-shaped frame so that when the bolt 5 is secured in position the locking block 4 is permanently and non-rotatably held between the ends of the U-shaped frame. The bolt 5 preferably is provided with a round head 7 and a squared shoulder 8 which passes through a squared opening in the U-shaped frame. The locking block is provided with a recess or hasp opening as at 9 and carries suitable locking mechanism of the spring latch type. Since the specific locking mechanism does not comprise a particular specific element in this invention the detail illustration and description of such locking mechanism is omitted. The key opening may be located at any convenient point in the locking device but preferably it is located as at 10 in Fig. 2. The upper part of the U-shaped frame is drilled and tapped to receive a small U-shaped bracket 11 which may be riveted or brazed securely in position. This bracket carries the locking arm 12 which is provided with a squared end 14 suitably pivoted between the arms and the U-shaped bracket 11 and adapted to coöperate with the leaf spring 15 to retain the locking arm 12 vertical in inoperative position as is indicated by the dotted lines in Fig. 1, when the said locking arm is not in use to lock the automobile. The leaf spring 15 may be seated beneath the square nut 16 of the bolt 5. The locking arm 12 is recessed as at 17 and is provided with lugs 18 which engage with each side of the square nut 16 to prevent the removal of the nut when the locking arm is in operation. The locking arm is also provided with a bolt or hasp member 110

19, which is constructed to enter the hasp opening 9 and to be suitably engaged by a tumbler diagrammatically illustrated at 20 in Fig. 1. The locking arm is provided at its outer end with a hook shaped member 21 which is constructed to hook over and lock the angle arm 22 of a steering knuckle on the front wheel 23 of an automobile when the front wheel has been turned at a considerable angle to the front axle 2. In order to permit the hook shaped end 2 of the locking arm 12 to be hooked over the angle arm 22, the pivoted or squared end 14 of the locking arm 12 is slotted as at 25 so that the arm 12 may be given a downward and then an endwise movement which enables the lugs 18 to embrace and cover the nut 16 and to permit the hasp 19 to engage the tumbler 20.

It will be noted that when the front wheels are so locked, that the automobile can only travel in a predetermined circle as is illustrated in Fig. 6.

Having thus described my invention what I claim is:—

1. An automobile lock adapted to be secured to the front axle of an automobile and comprising a U-shaped frame member in combination with a lock carrying block, means to secure the block within U-shaped frame member, a locking arm pivotally mounted upon said frame member, means to yieldingly retain said locking arm in inoperative position, and a lock within said locking block and coöperating with said locking arm, a hook on the end of said locking arm and adapted to engage the steering knuckle to retain a road wheel at an angle to the axle substantially as described.

2. In a device of the character described in combination, a U-shaped frame adapted to fit over the front axle of an automobile, a block constructed to fit within said U-shaped frame, a bolt adapted to retain said block in position within said frame, a pivoted locking arm mounted upon said frame, said locking arm being provided with a recess adapted to receive and inclose the nut of said bolt, locking mechanism provided within said locking block, a hasp upon said locking arm constructed to engage with said locking mechanism, an engaging member upon the outer end of said arm, said engaging member being adapted to coöperate with the angle arm of a front wheel to lock said front wheel in angular position relatively to said front axle.

3. In a device of the character described in combination, a U-shaped member adapted to engage and inclose a part of an automobile, a block adapted to fit within said U-shaped member, a bolt constructed to secure said block and said clevis member together, a locking arm pivotally mounted upon said clevis member and provided with a recess to receive and inclose the nut of said bolt, and locking means for retaining said locking arm in position over said nut.

4. In a device of the class described in combination, a locking block, locking mechanism carried by said locking block, a securing member for securing said locking block to a part of an automobile, a bolt fastening said locking block and securing member together, a locking arm provided with means to engage said locking mechanism, and means provided upon said locking arm to inclose and engage the nut of said bolt so that when said locking arm is locked in position the nut of said bolt is likewise locked in position.

5. In a device of the character described in combination, a locking arm adapted to engage the angle arm of the steering knuckle of an automobile, supporting means constructed to engage a part of the automobile and adapted to carry said locking arm, locking mechanism in engagement with said supporting means, a securing member securing said supporting means and locking mechanism together, and means provided on said locking arm for locking said securing member in position when said locking arm is locked in operative relation to the automobile.

6. In a device of the character described in combination, a frame, a locking mechanism carried by said frame, a pivoted lever mounted upon said frame, means to retain said lever in inoperative position, and hooked shaped means to lock said lever over the angle arm of the steering knuckle to lock the road wheel in angular relation to the axle of the automobile.

CHARLES OLIVER DICK.